United States Patent [19]

Martin et al.

[11] Patent Number: 4,609,107
[45] Date of Patent: Sep. 2, 1986

[54] EASY OPEN AND RECLOSABLE BAG HAVING A SEPARABLE RECLOSURE TIE

[75] Inventors: Andrew McG. Martin, 3 Arlington St., Boston, Mass. 02116; Kenneth C. Meyers, West Newton, Mass.; Daniel F. Pawling, Newton, Mass.

[73] Assignee: Andrew McG. Martin, Boston, Mass.

[21] Appl. No.: 600,419

[22] Filed: Apr. 16, 1984

[51] Int. Cl.⁴ ............................................. B65D 33/16
[52] U.S. Cl. ...................................... 206/610; 383/77
[58] Field of Search .................... 383/77, 62; 206/610, 206/611

[56] References Cited

U.S. PATENT DOCUMENTS

| | | | |
|---|---|---|---|
| 2,967,010 | 1/1961 | Cuffey, Jr. et al. | 206/611 |
| 3,131,852 | 5/1964 | Forbes, Jr. | 206/611 |
| 3,217,971 | 11/1965 | Shuetz | 383/77 |
| 3,618,439 | 11/1971 | Zelnick | 206/390 |
| 3,674,135 | 7/1972 | Simon | 383/77 |
| 3,736,219 | 5/1973 | McTaggart | 383/119 |
| 3,779,139 | 12/1973 | White | 383/77 |
| 4,066,167 | 1/1978 | Hanna et al. | 383/62 |
| 4,170,305 | 10/1979 | Hull, Jr. et al. | 206/611 |

Primary Examiner—Stephen P. Garbe
Attorney, Agent, or Firm—Cesari and McKenna

[57] ABSTRACT

An easy open and reclosable bag has flexible sheet walls sealed together to form a pouch. A separable reclosure tie is located adjacent one of those seals. The reclosure tie is composed of extensions of the bag walls which have an integral channel-shaped molding spaced from that seal. A line of specially shaped, closely spaced apart perforations through the bag walls extends between the molding and the one seal to permit the reclosure tie to be separated from the pouch-defining walls of the bag. Apparatus for making the easy open and reclosable bag is also disclosed.

27 Claims, 23 Drawing Figures

EASY OPEN AND RECLOSABLE BAG HAVING A SEPARABLE RECLOSURE TIE

This invention relates generally to packaging and more specifically to a bag that is easily opened and reclosable and to the apparatus for making such a bag.

BACKGROUND OF THE INVENTION

Flexible packages and bags are used for containing and storing a wide variety of materials. Although the invention has application to many different types of packaging, it is particularly suited for bags that are used to package snack foods and other food products and that are composed of thin cellophane or organic polymer base plastic materials that have limited tear resistance once a tear starts.

Hundreds of millions of such bags are made each year. They are manufactured in a combined form-and-fill apparatus in which the sheet packaging is drawn past a guide which directs the material into a tubular form surrounding a mandril. As the material is drawn along the mandril, an overlapping or fin-type longitudinal seal is formed in the material sealed by a heat or pressure sealing process. The material is thus formed into a continuous tube as it passes over the mandril. The material then feeds two heat sealing jaws that are disposed to form a transverse sealing area across the tube thereby to form simultaneously a top seal in one bag and a bottom seal on an adjacent bag. When this occurs, the apparatus feeds a measured amount of the snack food or other material into the bag having the bottom seal through a passage in the mandril. The tube is then advanced to bring the top of the just-filled bag opposite the sealing jaws and the jaws are actuated to form another sealing area which includes a top seal in the just filled bag and a bottom seal in the next bag to be filled. Accordingly, each sealed bag contains a longitudinal seal and transverse seals at its opposite ends which define a hermetically sealed pouch or package for the snack food or other contents. The sealing jaws normally also contain a mechanism for severing each bag after it is filled and sealed from the tube of packaging material so that the severed bag can be advanced to an appropriate location to prepare it for bulk shipment to its ultimate destination. This form and fill manufacturing process is widely used and accepted because it is reasonably simple, requires a minimal number of operations and has proven over the years to be quite reliable.

However, bags and packages formed by this process are not without their problems as purchasers of snack foods and other material contained in such bags are well aware. Some of the bags can be difficult to open because the plastic material of which they are made is highly resistant to puncture. Typically, a purchaser will attempt to open such a bag either by tearing through the seal or by trying to separate the seal. When an attempt is made to tear through the seal, the user finds it very difficult to start the tear. Indeed, it is not unusual for the user to chew the bag in an attempt to tear the bag's seal. However, once a tear is started, the direction of such a tear and the length of the tear are more or less random. The nature of such packaging material is that the tear could travel in any direction along the bag wall and, depending upon the force utilized to start the tear, could travel for various distances along that wall. In extreme cases, the tear can propagate all the way down one side of the bag allowing the bag contents to spill. On the other hand, if the purchaser grabs the opposite walls of the bag and tries to pull the walls apart to separate the top seal from below, a random opening can also occur. That is, the force required to separate that seal varies widely and is not predictable. Consequently, in some cases, the purchaser may pull the walls apart with too much force with the result that the bag tears and spills its contents.

In many cases, also, these bags contain perishable contents and such contents become stale if exposed too long to air. Therefore, if the contents of such bags are only partially consumed, it is not easy to reclose the bags with sufficient tightness to preserve the freshness of the remaining bag contents. Usually, the purchaser is left to twisting or rolling up the open end of the bag, assuming that remains intact when the bag is opened. However, at best, the bag material, having a memory, tends to resume its original shape and the rolled or twisted portion of the bag tends to straighten sufficiently to expose the bag contents to air. It is thus difficult to effectively reclose a plastic package or bag of this type without some separate closure element which, as a practical matter, adds to the bag cost and often becomes lost.

Considerable research and development has been expended in order to provide a bag or package of this general type which is easy to open and yet which can be reclosed simply and conveniently. Indeed, some bags have been designed in an attempt to solve both the opening and reclosing problems affecting such bags. Generally, these bag designs include some structure for assisting or directing the opening by tearing of the bag and some element formed integrally with the bag, but which is removable from the bag, so that the element can be used to reclose the bag if the bag contents are only partially consumed. For example, U.S. Pat. No. 3,184,149 discloses a resealable bag. This bag includes a sheet of flexible material having a structure for cutting through the side of the bag to expose the contents for consumption or use. If the contents are only partially utilized, a protective layer formed in a top seal portion of the bag is removed to expose a coextensive area of adhesive material. When the top of the bag is folded down against itself, the adhesive material adheres to the bottom seal to close the bag. U.S. Pat. No. 3,224,640 discloses a bag having at least three walls. The contents are stored in a pouch between the first and second walls. The bag includes a tear line which extends partially through the seal. As the top is torn off the bag, the contents are exposed. A slit is formed in the third wall to receive the top of the bag after it is folded over. U.S. Pat. No. 3,618,850 discloses a bag in which a pleated foil strip is affixed to the bag just below one end of the end seal. The bag is opened by tearing through the seal. The foil serves as a tear stop and it guides the tear transversely across the bag. If the bag contents are only partially consumed, the top of the bag can be folded about a transverse axis that passes through the foil. The pleats in the foil then tend to retain the folded shape of the foil and thereby keep the bag closed.

Another group of bag designs are characterized by a tear strip that can also be used to reclose the bag. U.S. Pat. Nos. 3,311,288 and 3,426,959 disclose such bags. More specifically, a tear strip is affixed transversely across the bag into one wall in the area of the pouch. When the tear strip is pulled, it rips the bag under the tear strip and exposes the bag contents. Once the tear strip has been removed, it can be saved to reclose the bag by being wrapped around the bag. U.S. Pat. No. 3,480,198 discloses a bag in which a tear line is formed across the bag in one or both walls of the bag inwardly of the heat seal; that is, the tear line is on the walls that are separated to form the pouch for the bag contents. The tear line is formed by apertures through both side walls that are fused around their edges so that the seal is not broken until the bag is torn along the tear line. The top segment of the bag can thus be removed to form a tie for the bag to seal in the remaining contents. However, this action does not open the bag completely.

U.S. Pat. No. 3,613,874 shows a bag in which a pressure sensitive adhesive is applied as in the case of the bag in the aforementioned U.S. Pat. No. 3,184,149. A tear strip is also provided to tear away a portion of the bag. That tear strip has a relatively high tensile strength and it is bonded rather strongly to the film forming the bag in such a way that the strip will not break or pull away from the film, but will overcome the film's tear strength when it is pulled away thereby tearing the bag. U.S. Pat. No. 3,619,395 shows a plastic bag with a tear strip in the form of a ribbon which is pulled to tear the bag. This bag contains a releasable fastening means on the inner, opposite wall surfaces of the bag which enable the bag to be resealed.

U.S. Pat. No. 3,674,135 treats separately the problem of reclosing a previously opened bag. It discloses a roll of plastic bags sequentially dispensed from a carton. The roll comprises a two-ply strip of plastic sealed along its sides to form a tube. The two plies are also joined by a series of pairs of transverse seals one of each said pair defining the bottom of a bag. A series of pairs of perforations are located adjacent said pairs of seals (i.e., interfitted therewith) for separating sections of the strip to define the open top of a bag and to separate a closure band defined by each said pair of spaced perforations. However, the perforations are disclosed as straight slits or as saw tooth cuts in the bag material which encourage uncontrolled tearing of the bag walls. They also encourage tearing of the closure band when the band is separated from the body of the bag and tensioned in use. Further, the transverse seals formed in the strip are flat so that the closure band is not otherwise as strong as might be desired.

The individual problem of facilitating the opening of these bags has also been addressed separately. One general approach for solving the problem can be characterized as providing tabs above the seal or outside the seal for facilitating the opening. This approach is exemplified in U.S. Pat. Nos. 3,397,835 and 3,419,137, as well as in British Pat. No. 620,354. In the bag shown in the first such patent, for example, a bag corner portion or inset is heat-sealed and includes a tear line. To open the bag, the portion of the bag outside the tear line is removed. Then the opposite walls of the bag in the inset, which are nbt sealed together, can be grasped individually to facilitate opening the bag. Another approach has been to add structure to the bag that will limit or direct the tear during the opening of the bag.

Folding the bag material to produce folded portions around the bag are shown in U.S. Pat. No. 4,053,116. The use of transverse beads to limit the tear is shown in U.S. Pat. Nos. 3,323,707 and 4,139,643. Other examples of such bags are disclosed in U.S. Pat. Nos. 2,023,855; 3,142,918 and 3,179,327. The use of special chemical treatments by placing a coating between the heat-sealed surfaces of the bag before bonding to facilitate opening is shown in U.S. Pat. No. 3,511,436.

None of the aforementioned prior bag configurations have gained wide, if any, commercial acceptance. Many of them are characterized by being more expensive to manufacture than a conventional bag or involve manufacturing techniques that are unfamiliar to the industry which is therefore reluctant to adopt them. Most importantly, the prior packages and bags which incorporate pull-apart finger openings and/or a removable reclosure tie incorporated into the bag still suffer uncontrolled tears when the purchasers try to use the easy-opening feature or to remove the reclosure tie for use. Indeed, the problem of uncontrolled tear propagation in such packages and bags has effectively prevented manufacturers from incorporating an easy-opening, pull-apart feature or a removable reclosure tie feature into bags and packages of this general type at a reasonable cost. In other words, those prior bag designs which are cost effective have not been able to reliably control the tearing of the bag walls which occurs when the purchaser tries to use the easy-open or reclosable feature of such packages and bags, with the result that the bags split and tear apart to the ultimate annoyance of the purchaser.

Relatively recently, bag designs have been developed that do incorporate an easy open feature as well as a reclosing feature and which can be manufactured at reasonable cost by more or less standard forming and filling apparatus, using techniques and procedures familiar to the packaging industry. Such bags and the apparatus for making them are disclosed in U.S. application Ser. No. 451,170, filed Nov. 29, 1982, entitled EASILY OPENED AND RECLOSABLE BAG AND APPARATUS FOR MAKING SAME, owned by the assignee of the present application. While those bags do work well and represent a significant improvement over previous such designs, they still do not provide optimum results at least with some bag materials. That is, the bags made in accordance with the techniques disclosed there occasionally still do suffer random tearing. This is especially so in the case of bags made of the laminated plastic materials and metalized plastic materials most preferred by the food industry for packaging snack foods such as potato chips, candy, popcorn, etc. and which are characterized by high puncture-resistance but low tear resistance. A typical such material is a lamination of at least two sheets of different-thickness polypropylene films bonded together by a film of polyethylene.

Apparently, this unwanted tearing is due to the fact that when the individual bags are formed and separated from the continuous tube of packaging material, tiny tear sites are created in the cut edges of the bag material each of which promotes or encourages the start of an unwanted and undirected tear in the bag walls. Some of these tear sites are present at the upper edge of the bag and promote uncontrolled tears at that location when the user tries to open the top seal of the bag, even if that seal includes pull-open tabs intended to facilitate breaking the seal. Some such sites are present at the bottom edge of the bag or at the locations in the bag walls which are perforated to form the parting or separation line along which the reclosure tie is separated from the bag. Tears started at those locations sometimes propagate destructively along the bag walls thereby exposing the bag contents or into the reclosure tie thereby weakening the tie with the result that the tie breaks when tensioned in the process of reclosing the bag.

In addition, we have found that when the reclosure tie is separated from the rest of the bag for use, the separation process itself sometimes produces tear sites in the bag material along the reclosure tie parting line which promote uncontrolled tearing and weakening of the bag itself and/or its reclosure tie. The separable reclosure ties in those prior bags are somewhat disadvantaged in other respects in that they are not as strong as might be desired and sometimes they are difficult to release or untie after they have been used to reclose the associated bags.

SUMMARY OF THE INVENTION

Accordingly, the present invention aims to provide a package or bag which is easy to open and/or to reclose.

A further object of the invention is to provide a bag of this type that can be made without the addition of any separate or discrete elements to the bag.

Still another object of the invention is to provide an easily opened and/or reclosable bag that can be made without special manufacturing procedures and that can be integrated easily into a standard bag manufacturing process.

Another object of the invention is to provide a bag of this general type which can be made without any significant increase in the amount of material required to make the bag.

Yet another object of the invention is to provide an easily opened and/or reclosable bag that can be manufactured at almost the same cost as a conventional bag.

A further object of the invention is to provide a bag or package whose walls can be torn along a precisely controlled tear line in order to open the bag or in order to separate a reclosure tie from the bag.

Still another object is to provide such a bag having an improved separable reclosure tie.

Another object of the invention is to provide a flexible bag or package having a specially designed parting or tear line which achieves a controlled parting or separating of the packaging material only along that line.

Still another object of the invention is to provide apparatus for making a bag having one or more of the above characteristics.

Yet another object of the invention is to provide apparatus for converting a facility for producing filled sealed bags to produce easily opened and/or reclosable bags without requiring any significant modification to the conventional bag manufacturing apparatus.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

In general, in accordance with one aspect of our invention, a bag or package is formed to enclose its contents in a pouch between the walls of the bag and at least one seal is formed by the material of the bag to close an open end or side of the bag. An easy opening feature may be provided in the bag by forming an unsealed portion at one seal which exposes separated wall portions adjacent to that seal and which facilitates the gripping of the separated wall portions in order to break the seal to gain access to the interior of the bag. A reclosable feature is provided by a reclosure element or tie that is formed integrally with the bag when, the bag is manufactured in at least one of the bag seals. Using that tie, the open end of the bag can be reclosed after the seal at that end has been broken in order to exclude air from the interior of the bag and thereby preserve any remaining contents of the bag.

As will be seen later, the integral reclosure tie that is formed in accordance with this invention is unusually strong due to the inclusion in the tie of a unique integral channel-shaped molding. Therefore, when it is used to reclose the opening into the bag by tying it around a gathered-together portion of the bag, there is little likelihood of the tie breaking. Yet, the construction of the tie prevents it from being knotted so tightly that it is difficult to untie and remove when it is desired to reopen the bag.

The ability of the present bag to be opened easily and/or reclosed as aforesaid results from the unique design of the bag which avoids the creation of nicks in the cut edges of the bag walls when the bag is formed and when the purchaser uses the easy open feature or the reclosing feature of the bag. For purposes of this disclosure, a nick means any hole, notch, slit, or other type of small cut or opening in an edge of the material comprising bag 10. We have found that the unwanted tearing of the bag material usually starts at such a nick, particularly if the nick has edges defining an acute angle, e.g. a V-shaped cut.

Another aspect of our invention involves a specific parting line design or configuration which assures controlled tearing of the bag material only along that line. With such controlled tearing, a bag can be opened easily only at the location where such opening is desired. Also, the specially constructed integral reclosure tie can be separated or pulled away from the body of the bag without any likelihood of the bag walls or the reclosure tie being damaged in the process. As will be described in detail later, the parting line which achieves such controlled tearing is composed of uniquely shaped perforations or slits extending adjacent a seal in the bag which assure that a tear initiated at any point in such line will propagate only along that line, whether such tear is to open the bag or to separate a reclosure tie from the body of the bag.

Yet with all of these advantages, the bag is relatively easy to make using a standard bag manufacturing process and the amount of material required to make each bag is not appreciably more than that required to make a conventional bag which does not have the aforesaid advantages and capabilities. Consequently, the overall cost of our bag should be competitive with the cost of conventional bags.

The apparatus for making our bag differs from conventional apparatus for forming and filling bags of this general type only in having special heat-sealing jaws that simultaneously form the sealed areas in adjacent bags. These jaws, which can be incorporated into standard forming and filling apparatus in lieu of the conventional sealing jaws therein, can form simultaneously (1) a seal in one bag including, if desired, an unsealed area in that seal to provide an easy opening feature in that bag, (2) a seal in an adjacent bag, (3) a separable reclosure tie in one of the adjacent bags and (4) a sever line for separating the adjacent bags.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENTS

Figure 1:
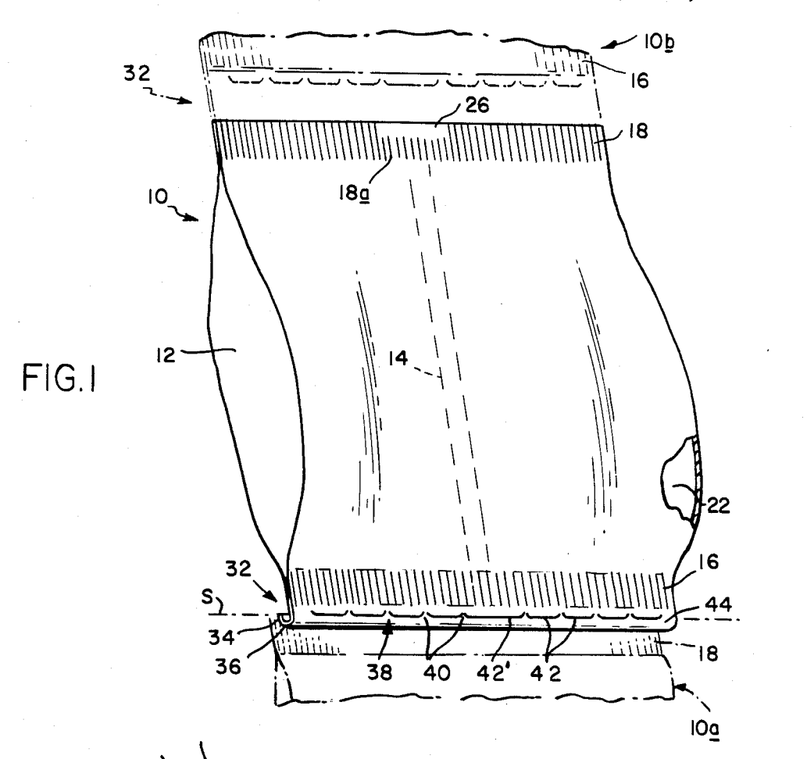
FIG. 1 is a perspective view of an easy open bag or package having an integral, but separable reclosure tie for reclosing the bag made in accordance with this invention.

Referring to FIG. 1 of the drawings, a bag made in accordance with this invention is indicated generally at 10. The illustrated bag is of a type suitable for containing a snack food such as candy, dried nuts, potato chips, etc. Bag 10 is formed of a suitable heat-sealable, treated cellophane or other thin organic polymer-based flexible sheet material 12 that is approved for use with food products. Flexible plastic materials particularly preferred by the industry for packaging such foods are polyethylene and polypropylene sheets and films and laminates thereof. As a general rule, these film or sheet materials are characterized by their relatively high resistance to puncture and to the initiation of a tear. It is a further characteristic of such materials that, once a tear is initiated in the material, that tear propagates easily through the material in an uncontrolled, undirectioned manner.

To make bag 10, the sheet material 12 is formed into a tube or cylinder. Then overlapping lengthwise margins of the material are heat sealed as shown in phantom at 14 in FIG. 1. A transverse heat seal 16 extends across the bottom of the bag to close the bag at that end. A second transverse heat seal 18 closes the top of the bag thereby defining a hermetically sealed pouch 22 for the bag contents.

Bag 10 is formed and filled in a continuous manufacturing process so that the seal 16 at the bottom of bag 10 is formed at the same time as the top seal 18 of the previous, just-filled bag 10a and the top seal 18 of bag 10 is formed at the same time as the bottom seal of the next and, as yet unfilled, bag 10b in the series as indicated in FIG. 1. After the formation of each pair of seals 16 and 18, adjacent bags are separated along a separation line S. As will be described in detail later, the separation of the bags along line S is accomplished by severing the bag material 12 smoothly and evenly such that no nicks are produced in the material edges that could be sites for, or promote, uncontrolled tearing of the bag material.

As shown in FIG. 1, an unsealed area 26 may be provided in the top seal 18 adjacent the upper edge of the bag. This still leaves a sealed area 18a between that unsealed area and pouch 22 to maintain the integrity of the overall top seal 18.

Bag 10 carries an integral reclosure tie shown generally at 32 which is present at the bottom of bag 10 below its seal 16 and above the seal 18 of the previously filled bag 10a. The reclosure tie comprises a short integral lengthwise segment 34 of the bag-forming tube whose opposite walls are bonded together to form a molded channel 36 that extends transversely across segment 34 parallel to seal 16.

As seen in FIG. 1, the mold channel 36 is a relatively stiff structure which has its own texture and it has a U- or C-shaped cross section as distinguished from a solid rib or ridge as might be caused by displacement of the bag material. As such, when the tie 32 is still attached to the body of the bag, the channel curls up and is often the lowest edge of the bag as shown in FIG. 1. Therefore, it gives the bottom of the bag a finished edge which is pleasing aesthetically; it also reinforces the lower end of the bag when the bag is stood on end.

Although formed integrally with bag 10, the reclosure tie 32 is separable from the bag along a transverse parting line indicated generally at 38 which extends the entire width of the bag between seal 16 and mold channel or ridge 36. The parting line 38 is composed of a lengthwise series of tabs 40 separated by perforations or slits 42 which, as will be described in detail later, are specially shaped and positioned to achieve a controlled tear only along the parting line 38 when the reclosure tie 32 is separated from the body of bag 10.

Figure 2A:
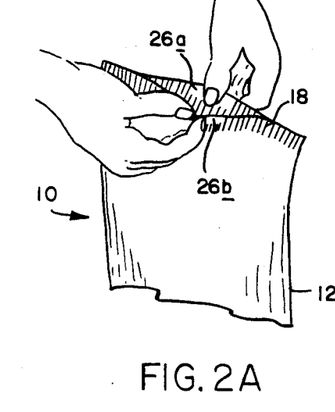
FIG. 2A is a fragmentary perspective view on a smaller scale of the FIG. 1 bag which illustrates the easy open feature of that bag.

The ease with which bag 10 can be opened can be seen from FIGS. 1 and 2A. The unsealed area 26 in its top seal 18 is exposed right at the upper edge of the bag. That being the case, the opposite walls of the bag within that area define separated tabs 26a and 26b which the user can grasp with the fingers of his two hands and pull apart as illustrated in FIG. 2A. This separates the portions of the bag walls forming the top seal 18 and thus opens pouch 22 exposing the contents of the bag without creating any new nicks. The forming in bag 10 of a top seal 18 with an unsealed area 26 in conjunction with the providing of an even, nick-free edge at the top of the bag produces several advantages. More particularly, the upper edge of the bag, being nick free, is aesthetically more pleasing than a bag with a ragged edge. Also, the absence of nicks in the material edges at that location minimizes the likelihood of the bag tearing when it is opened using tabs 26a and 26b. Therefore, any advertising on the bag is preserved and there is no spillage of the bag contents. Further, the bag, being intact, can be reclosed easily using the reclosure tie 32. In other words, the easy open pull apart tabs 26a and 26b and the absences of nicks enhance the reclosing capability of the bag 10.

Figure 2B:
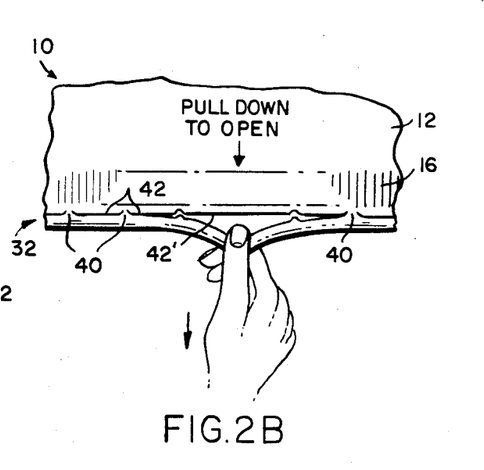
FIG. 2B is a similar view of the FIG. 1 bag showing the procedure for removing the reclosure tie from the body of that bag.

After the bag 10 has been opened as aforesaid and the contents partially consumed, the bag can be reclosed using the reclosure tie 32. To do this, the user first separates the reclosure tie from the body of the bag along the parting line 38. Because of the special design of the tie and its connection to the bag to be discussed presently, it is desirable that the tie be separated by grasping the middle of the tie and pulling the tie vertically away from bottom seal 16 as shown in FIG. 2B. In this respect, the mold channel 36 helps the user to grip the tie. This action applies less lateral tear force to the bag than if one were to try to tear the tie 32 from the body of the bag laterally beginning at the left- or right-hand end of the tie. Resultantly, there is less chance of the removal of the tie precipitating an uncontrolled tear in the bag material 12. To induce the user to separate the tie from the bag using a downward pulling action as shown in FIG. 2B, the parting line 38 ends terminate well inboard of the opposite sides of the bag. That is, parting line 38 is appreciably shorter than the bag width so that relatively wide unperforated areas 44 are present at the lower two corners of the bag 16. Furthermore, the tear line 38 is formed with an extra long "easy-start" perforation 42' in the middle of the line directly below a PULL DOWN TO OPEN arrow printed on the bag. The extra length and perforation 42' also insures that a perforation will always be present across the entire width of seal 14 where plural layers of material 12 are present. The unperforated areas 44 have straight, even outside and bottom edges that make it quite difficult for the user to tear the tie 32 beginning at the left or right end of the tie. Accordingly, the user is induced to follow the printed directions and to separate the tie from the bag by pulling down on the middle of the tie at the central perforation 42' as shown.

Figure 3:
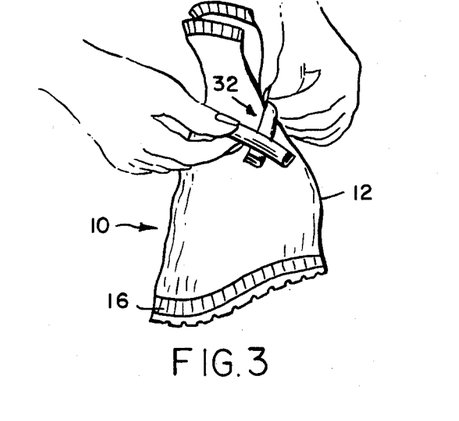
FIGS. 3 and 4 are perspective views of the FIG. 1 bag after it has been opened showing one approach for reclosing the bag using integral reclosure tie.
Figure 4:
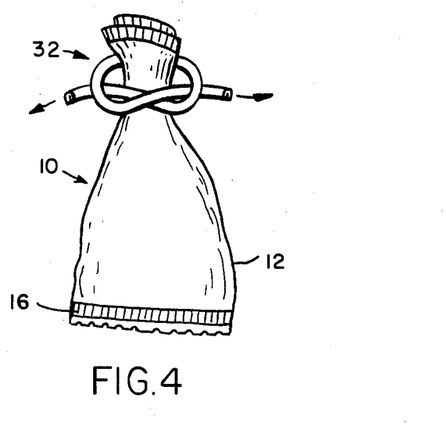

The resultant tear or parting propagates in both directions along line 38 from the middle of the bag toward both sides thereof until the tie separates completely from the body of the bag. The user can then gather together the empty upper portion of the bag about the remaining bag contents and wind the reclosure tie 32 about that gathering as shown in FIG. 3. Then an overhand or other type of knot can be formed in the tie as depicted in FIG. 4, with the knot being pulled tight around the gathered neck of the bag to reclose the bag.

Figure 5:
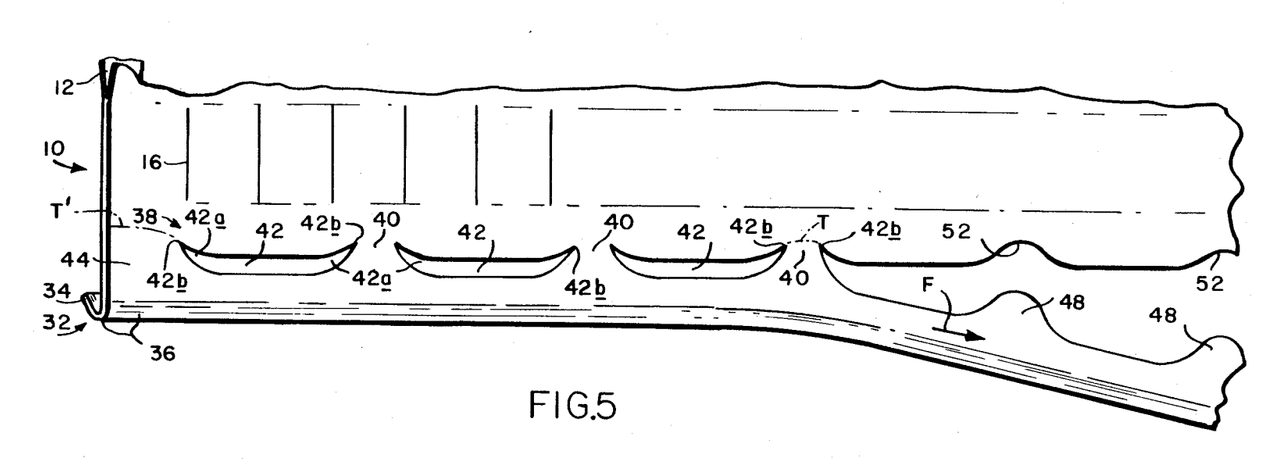
FIG. 5 is a fragmentary perspective view on a much larger scale showing the reclosure tie at the lower end of the FIG. 1 bag in greater detail.

As mentioned at the outset, it is very difficult to control a tear in bag material of this general type so that the tear follows only the parting line formed in the bag. The tie 32 and its parting line 38 shown in detail in FIG. 5 are specially designed to do that when the tie is pulled downward away from the body of bag 10 as described above. As seen in that figure, tie 32 is connected to the body of bag 10 only along parting line 38. That parting line is composed of uniquely shaped and designed perforations 42 in the packaging material 12 separated by specifically shaped and sized areas of uncut packaging material referred to herein as tabs 40. The purpose of the line of perforations and tabs is to effect a more or less straight-line tear in packaging material 12 which material does not normally have the properties necessary to propagate a tear along a controlled tear line in response to a tear vector, i.e. a directed tear force. As shown in FIG. 5, each perforation 42 (as well as perforation 42') in line 38 is formed as a slit with substantial length and appreciable maximum height (e.g. $0.7 \times 0.06$ inch). The opposite end segments 42a of the perforation curve upwards and the perforation tapers to end points 42b. Because the perforation 42 has upturned tapered ends, it suggests a smile and that is how we refer to the perforations herein, i.e. smile perforations. The pointed ends 42b of adjacent perforations 42 are spaced closely to one another so that the tie is connected to the rest of the bag only by way of the tabs 40 between the perforations which are only about 0.032 inch wide (i.e., x axis) and 0.060 inch long (i.e., y axis) and the unperforated areas 44 at the opposite ends of the tie. Obviously, those dimensions may vary for different film materials.

A downward pull on the middle of the reclosure tie applies a tensile force to the tie as indicated by the vector F in FIG. 5. Where the tie is already separated from the remainder of the bag, e.g. starting at the extra wide easy-start perforation 42', that force has a substantial vertical component. The edges of each perforation 42 (and 42') are straight or gently curved and are nick-free except at the perforation ends 42b. These end locations are, in fact, intentionally created and shaped nicks which constitute the only tear sites in perforation line 38 and thus the weakest parts of the bag structure between the middle of the reclosure tie where the downward pulling force is applied by the user and the body of the bag held stationary by the user. Accordingly, tears are always initiated in the edges of the intact tabs 40 at the adjacent pointed perforation ends 42b, beginning with the two tabs bracketing perforation 42'.

As mentioned at the outset, a tear, once started in such bag material 12, usually propagates through the material in an uncontrolled undirected manner. Here, however, with the tearing force direction being more or less fixed, the shape of the smile perforations establishes a gently upwardly curved path or line of least resistance through that material to the nearest nick or weak point in the material, namely, the end of the perforation 42 located on the opposite side edge of the tab 40 being torn. Thus, when tie 32 is pulled away, each tab 40 parts from the body of the bag along an upwardly curved or arched tear line, one of which is shown in dotted lines at T in FIG. 5. Thus, the smile perforations 42 are designed to (1) control the site at which each tear starts in the parting line 38 when the tie 32 is pulled from the body of the bag as shown, (2) control the general direction of propagation of each such tear, and (3) maximize the chances of each propagating tear T being captured or intercepted by the nearest perforation 42. In the illustrated bag 10 whose tie 32 is pulled away by applying a force at the middle of the tie, the tears T propagate transversely in both directions along parting line 38. Consequently, the smile perforations are symmetric about their vertical centerlines. As we shall see later, if the separating force is applied elsewhere on the tie, the perforations may have a different shape.

In any event, the downward pull on tie 32 causes the tabs 40 progressively further away from the middle of the tie to tear away from the remainder of the bag along their respective tear lines T until the tie is completely free. The two outermost tear lines extend generally arcuately across areas 44 to the side edges of the bag as shown in dotted lines at T' in FIG. 5. Because of the perforation 42 shape, there is little tendency for the tears across tabs 40 to deviate from the parting line 38. However, if by chance a tear should stray upwardly from its intended tear line T, it encounters bottom seal 16 which tends to redirect that uncontrolled tear back to parting line 38. Likewise, a tear which deviates from its intended path T in the downward direction eventually encounters the tear resistant mold channel 36 which redirects the errant tear back to the parting line 38. That channel also adds horizontal stiffness to the tie so that as it is being pulled away, the tie does not bend too sharply at each tab 40 as might encourage the tear T to deviate downwardly into tie 32.

It is important to note that, when the bag material 12 parts along a tear line T, the associated tab 40 is pulled away with the tie and forms a rounded nub 48 at the edge of the tie. The pulling away of that nub leaves a nick 52 at the lower edge of the bag. Thus, when reclosure tie 32 is removed from the bottom of the bag, due to the shape of perforations 42, the rounded nubs 48 are always on the tie, leaving the rounded nicks 52 in the bottom edge of the bag. Although those nicks 52 do constitute tear sites, they are located well inboard of the lower two corners of the bag and below the bottom seal 16. Therefore, there is no reason to expect a tear to be started at those locations which would propagate far enough to violate the integrity of pouch 22.

The presence of the mold channel 36 and the specially shaped perforations 42 in the bag structure also contribute to the strength and integrity of the reclosure tie 32 itself. More particularly, the mold channel 36 causes the tie segment 34 in the finished, separated bag 10 to curl upon itself as depicted in FIG. 5 so that the tie actually constitutes four layers of packaging material 12. That curl coupled with the channel-shaped molding 36 itself creates a tie 32 which has especially high tensile strength so that there is little likelihood of the tie breaking when it is knotted around the top of the bag as shown in FIG. 4 and pulled tight. The mold channel 36 and the curl which it creates in the reclosure tie also make it easier to grasp the tie 32 and manipulate the tie as necessary to secure it around the gathered bag neck than would be the case if the tie were a flat film structure. Yet, after the tie is knotted about the bag, the channel and curl in the tie prevent the tie from becoming knotted so tightly that it is difficult to untie when one desires to reopen the bag. In other words, the channel 36 prevents the film layers comprising the tie from lying flat and conforming to the various twists and curves in the knot so that they lie in such intimate contact that it is difficult to loosen the knot. The creation of channel 36 by a fusing or bonding of material 12 rather than a melting thereof is desirable in that it requires no more heat than is required to form seals 16 and 18. In some applications, however, it may be desirable to heat material 12 sufficiently to cause some flow of that material so that channel 36 is actually a melt channel which is stronger and more tear-resistant than a mold channel.

As alluded to above, the smile perforations 42 help to preserve the integrity of the reclosure tie because, when the tie is pulled away from the body of the bag, the tie always parts along the upwardly arched tear lines T, leaving gently rounded nubs 48 at the edge of the reclosure tie. No nicks or cuts are created in the tie as it is torn away that could be sites for tears when the tie is tensioned upon being wound about the bag and knotted to reclose the bag as shown in FIG. 4. The opposite edge of the reclosure tie is also nick free since it constitutes the lower edge of the bag structure as a whole which was separated from the adjacent bag 10a (FIG. 1). As described above, that separation is achieved in such a way as to create a clean, nick-free cut between the two bags. Therefore, there are no tear sites there either.

Thus, it is apparent that bag 10 may be opened easily and reclosed and it achieves all of the other objects of this invention. Specifically, the reclosure tie 32 is formed integrally with the bag during the bag forming and filling process. When the reclosure tie is incorporated into a bag, very little (i.e. ½ inch) additional material 12 length is required than is present in existing bags. Thus the cost of bag 10 should not be significantly greater than that of a conventional bag which has neither the easy open nor the reclosure feature of bag 10. Moreover, the bag illustrated in FIG. 1 is adapted for production in a conventional form-and-fill process without any significant modification to the standard forming and filling apparatus.

Figures 6, 11:
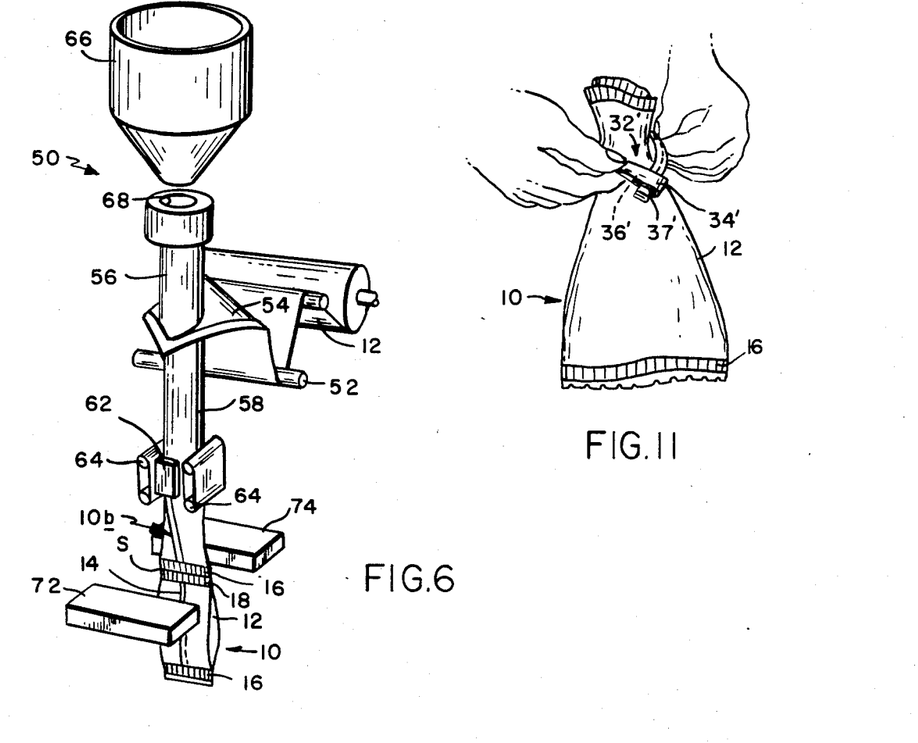
FIG. 6 is a perspective view in schematic form of typical forming and filling apparatus incorporating our special sealing jaws that enable the apparatus to make the FIG. 1 bag.
FIG. 11 is a perspective view on a much smaller scale of a third bag embodiment made in accordance with this invention.

The apparatus shown generally at 50 in FIG. 6 is typical of forming and filling apparatus known in the art. In apparatus 50, a roll of heat-sealable packaging material 12 used to make successive bags is carried past a guide roller 52 to a panning shoulder 54 that forms the material about a cylindrical mandril 56 into a folded, double thickness, tube 58. A heat seal bar 62 engaging tube 58 forms the longitudinal seal 14 shown in FIG. 1 as the tube is drawn downward around the mandril by belts 64. As the tube 58 passes by the lower end of the mandril 56, a measured amount of product from a hopper 66 is dispensed through a cylindrical passage 68 in mandril 56. The product falls into a bag 10b that has just been formed in the tube of material above a bottom seal 16 made by heat sealing jaws 72 and 74. These jaws, which are made in accordance with this invention, are shown only in diagrammatic form in FIG. 6, but are detailed in FIG. 7. As tube 58 is drawn down to the position occupied by bag 10, the sealing jaws 72 and 74 are brought together to form the upper seal 18 in bag 10 and the lower seal 16 in the next bag 10b to be filled which is still present, with its upper end open, at the bottom of mandril 56. In addition, the filled and sealed bag 10 and the bag 10b being filled are severed along the separation line S between seals 16 and 18.

As noted previously, apparatus 50 differs from prior apparatus of this general type only in its sealing jaws 72 and 74. The mechanisms (not shown) for actuating and controlling the sealing jaws are the same as those used to control the jaws used to make conventional bags in apparatus of this type. It is merely necessary to substitute in apparatus 50, the sealing jaws 72 and 74 that are designed specifically to make bag 10.

Figures 7, 7A, 7B:
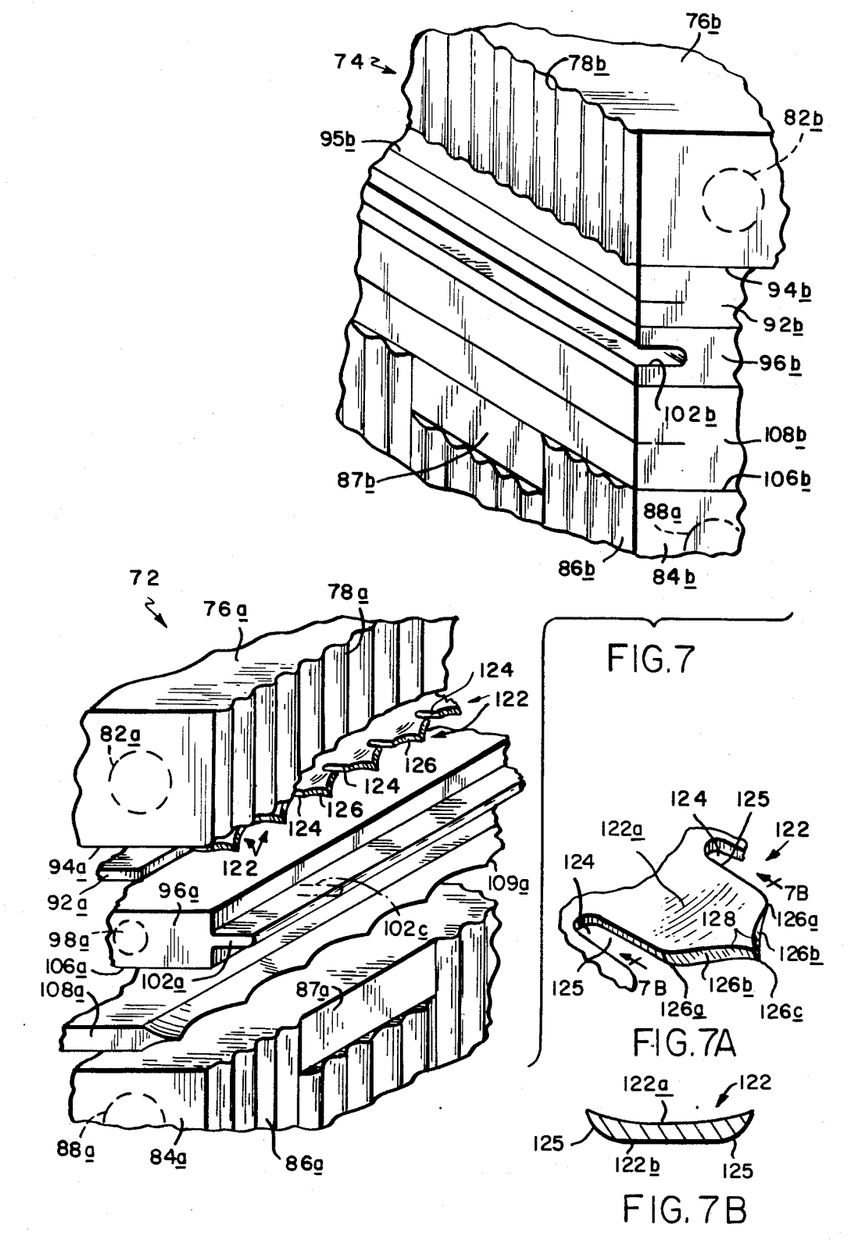
FIG. 7 is an exploded fragmentary perspective view on a larger scale showing the sealing jaws in the FIG. 6 apparatus in greater detail.
FIG. 7A is a fragmentary perspective view on a still larger scale showing an element of the FIG. 7 jaws in greater detail.
FIG. 7B is a sectional view along line 7B—7B of FIG. 7A.

Refer now to FIGS. 7 and 7A which show the sealing jaws 72 and 74 in greater detail. For ease of illustration, and for clarity, the heights and spacings of the various jaw components are exaggerated. They are complementary or mating jaws and each jaw is symmetric about its vertical centerline. Thus, the same reference numerals are applied to corresponding elements in the two jaws with the suffix "a" designating an element in jaw 72 and the suffix "b" designating an element in jaw 74.

Jaws 72 and 74 have upper sealing sections 76a and 76b whose opposing faces 78a and 78b are corrugated or rippled. The jaw sections carry internal transversely extending heaters 82a and 82b which extend the full width of the jaws. These heaters heat sections 76a and 76b to an appropriate temperature for bonding material 12, e.g. 225°–350° F. When the jaws 72 and 74 come together with bag tube 58 between them, those two jaw sections form the lower seal 16 of bag 10. Jaws 72 and 74 also include lower sealing sections 84a and 84b having opposing serrated faces 86a and 86b and internal heaters 88a and 88b which heat the sections to the same temperature as the upper sealing sections. When the jaws come together, sections 76a and 76b form the upper seal 18 of each bag 10. If that seal is to incude the easy-open feature, the surfaces 86a and 86b have milled out areas 87a and 87b to provide the unsealed area 26 in seal 18.

Located just below jaw section 76a is a perforating blade 92a which is movable in a cavity 94 independently of jaw sealing sections 76a and 84a toward and away from a blade back-up or bed 92b positioned in a cavity 94b in jaw 74. Bed 92b may have a transverse slit 95b for very snugly receiving the cutting edge of blade 92a.

The jaw 72 also includes a mold bar 96a positioned below blade 92a which is maintained at a temperature sufficient to fuse material 12 to form mold channel 36, e.g. 225°–350° F. If it is desired to melt material 12 to form a melt channel as discussed earlier, bag 96 may include an internal heater shown in dotted lines at 98a in FIG. 7 capable of heating the blade to a higher temperature, e.g. 450°–550° F. The mold bar moves with jaw 72 toward and away from an anvil 96b mounted in jaw 74 so that a transverse tongue or rib 102a at the front of the bar engages in a groove 102b in the opposing face of anvil 96b. That anvil 96b is normally heated to the same temperature and, in some applications, it may be kept slightly cooler by suitably insulating it from the remaining components of jaw 74 by insulation strips 104b positioned above and below the anvil. Below mold bar 96a is a transverse cavity 106a in which is positioned a serrated cutting blade 108a having cutting edge points 109a. Blade 108a is movable independently of the jaw-sealing sections 76a and 84a and mold bar 92a toward and away from a back-up or bed 108b located in a cavity 106b in jaw 74 above its sealing section 84b. Beds 92b and 108b can be made of a suitable resilient bed material such as heat-resistant rubber, plastic or even soft metal.

Figure 8A:
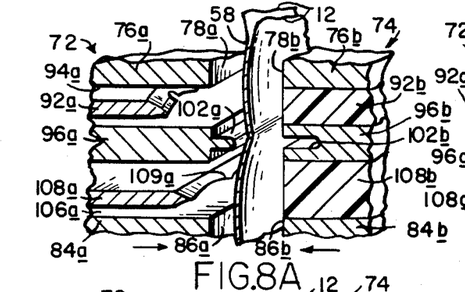
FIGS. 8A to 8H are fragmentary perspective views illustrating the sequence of operation of the FIG. 7 sealing jaws to make the FIG. 1 bag.

Referring now to FIGS. 7 and 8A, just prior to the apparatus 50 dispensing product to bag tube 58, the jaws 72 and 74 are brought together on opposite sides of the bag tube so that two layers of material 12 extend between the jaws. As the jaws begin to close, first the mold bar tongue 102a contacts and begins to evenly flatten the two layers of packaging material 12 against the sealing jaw faces 78b and 86b and across the mouth of the anvil groove 102b as shown in FIG. 8A thus driving out any air trapped between the layers of packaging material. During this time, blades 92a and 108a remain in their retracted positions within their respective cavities 94a and 106a. This protects the packaging material 12 from premature contact by those heated blades which could cause damage to the packaging material and thus to the resultant bag.

Figure 8B:
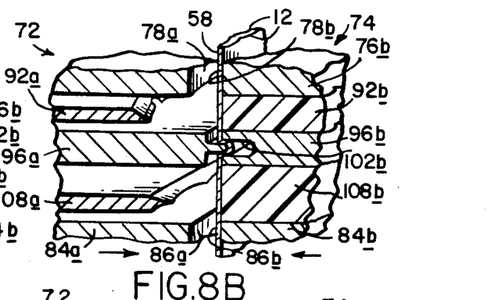
Figure 8C:
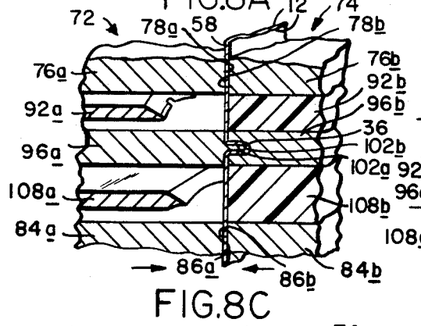

As the jaws continue to close, the mold bar tongue 102a begins to push the packaging material 12 into groove 102b as shown in FIG. 8B. This tensions the two sheets of packaging material 12 above and below that tongue, stretching it evenly in front of the jaw sealing faces 78a, 78b, 86a and 86b, as well as in front of the blade beds 92b and 108b, while blades 92a and 108a remain in their retracted positions, all as shown in FIG. 8B. When the jaws 72 and 74 are completely closed as shown in FIG. 8C, the heated tongue 102a has pushed the packaging material 12 completely into groove 102b. The heat is sufficient to cause that thermoplastic material to fuse or soften enough to bond the two walls of the flattened tube 58 together thereby forming the mold channel 36 of the FIG. 1 bag without destroying the integrity of or melting material 12. The packaging material 12 above tongue 102a is contacted and compressed by the jaw sealing faces 78a and 78b and the material below the tongue is compressed by the jaw sealing faces 86a and 86b. The compressing and heating of the material 12 thusly creates the bottom bag seal 16 and the top bag seal 18 of the adjacent bags 10b and 10 respectively as shown in FIG. 6.

In addition, the unsealed packaging material between the jaw top section faces 78a and 78b and the tongue and groove 102a and 102b is stretched across the face of the perforating blade bed 92b. At the same time, the unsealed material 12 between the jaw bottom section faces 86a and 86b and the tongue and groove 102a and 102b is stretched across the face of the cutting blade bed 108b. All the while, the blades 92a and 108a which remain retracted in their cavities, are heated by conduction from the heaters 82a, 88a and 98a in jaw 72. Alternatively, the blades may have separate heaters if that is found to be desirable to properly cut some heavier materials 12.

Figure 8D:
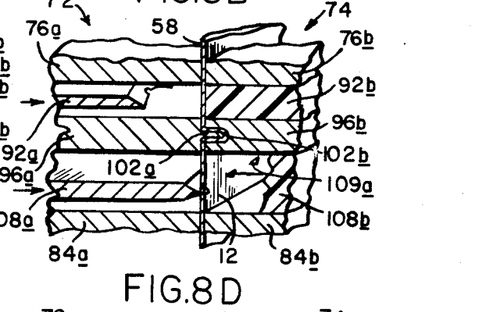

After the seals 16 and 18 and the mold channel 36 are formed as aforesaid, the blades 92a and 108a are actuated together or independently to move toward their respective beds 92b and 108b as shown in FIG. 8D. The blades are moved with the former usually leading the latter so that the points 109a of the serrated cutting blade 108a first contact and begin to penetrate the material 12 stretched across the face of bed 108b. The perforation blade 92a usually trails blade 108a by a distance on the order of one-sixteenth to one-quarter inch so that the two blades do not strike and begin to cut material 12 at the same time. This minimizes stress on the material where stress should be controlled in order to separate adjacent bags cleanly at separation line S (FIG. 1) and to form the perforations 42 therein without precipitating tears or creating tear sites in the material. Since material 12 is clamped above and below the cutting blade bed 108b when it is contacted by blade 108a, the material is stretched across that bed so that blade 108a severs the material with a clean quick slicing action. In other words, the tensioned material acts to resist the blade as the blade cuts through the material thereby assuring that the material 12 is slit instead of being roughly rent or broken so that nicks and jagged edges in the material are avoided. As the material is being cut, the heated mold bar tongue 102a continues to seal and mold the packaging material in groove 102b into the relatively stiff channel member 36.

Figure 8E:
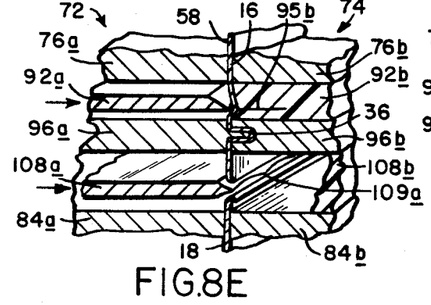

As shown in FIG. 8E, the blades continue to advance into their respective beds, the cutting blade 108a passing completely through material 12 into bed 108b so as to separate bag 10 whose top seal 18 is being formed by jaw sections 84a and 84b from the bag 10b whose bottom seal and reclosure tie 32 are being formed by jaw sections 76a and 76b and the mold bar 96a. As the flanks of the cutting blade 108a pass the cut edges of the packaging material 12, the residual heat in the blade heats and sears any frayed edges of the material assuring clean nick-free edges on the bottom of the reclosure tie 32 of each bag 10b (FIG. 6) and the top of each bag 10.

Also, the contact of the cutting blade with the material 12 stretches the material between the tongue and groove 102a and 102b and the jaw section faces 78a and 78b, thereby tensioning the material across the face of the perforating blade bed 92b. As noted previously, the perforating blade 92a contacts the packaging material 12 after the cutting blade 108a has commenced its cut so as to avoid undue stress on the material which could result in ragged cut edges. Of course, if a sufficiently strong bag material 12 is used, both of the blades could contact that material at more or less the same time without producing adverse consequences.

Figure 8F:
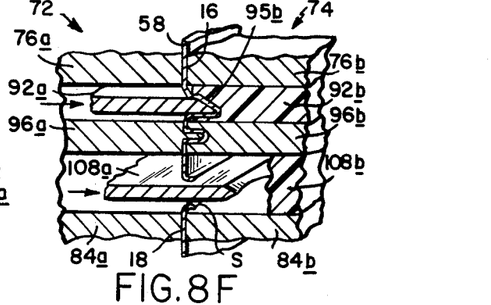

FIG. 8F shows the perforating blade 92a in its fully advanced position. As it penetrates bed 92b, it creates a slot or cut 95b in the bed (if not initially formed therein) whose opposite walls function as a squeegee to prevent the packaging material from being pushed into the bed along with the blade. Thus, the bed provides support for the packaging material, particularly the uncut areas thereof at tabs 40, and provides means for controlling the stress exerted by the perforating blade on the material, particularly at those tabs. Support of this nature is desirable because precise control of the stress exerted on material 12 will enable the jaws 72 and 74 to cut the precisely defined perforations 42 illustrated in FIG. 5 without overstressing tabs 40. Such precision is not crucial for the straight cut at line S created by the cutting blade 108a so that the bed 108b opposite that blade can be omitted if the material 12 is not particularly strong.

Figure 8G:
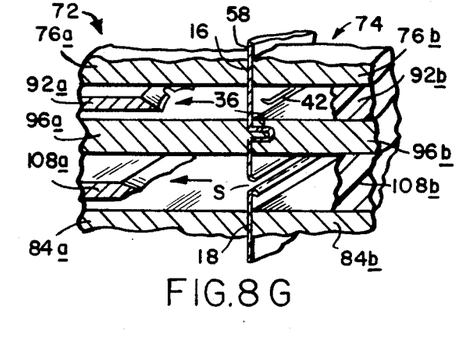

In any event, both blades 92a and 108a continue to sear and seal the cut edges of material 12 at the top and bottom ends of the bags and at perforations 42 as they proceed to the ends of their forward strokes, while the jaw sealing sections 76a, 76b, 84a and 84b and the tongue and groove 102a and 102b remain closed on packaging material 12. At the end of a selected short period of time, blades 92a and 108a are retracted into their respective cavities 94a and 106a as shown in FIG. 8G, with the smile perforations 42 having been formed in material 12 as shown in that figure. If perchance the film material were pushed into either bed 92b or 108b, that material is pulled out of the bed as the corresponding blade retracts out of contact with the packaging material 12.

Figure 8H:
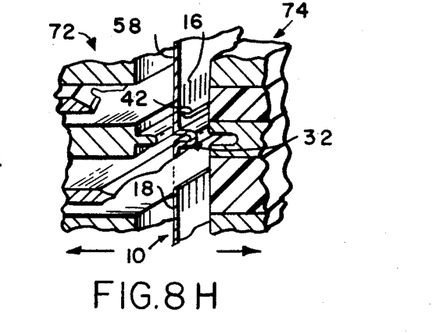

Finally, as shown in FIGS. 6 and 8H, the sealing jaws 72 and 74 are opened thereby releasing tube 58, bag 10b having been formed and bottom-sealed as aforesaid and so that the sealed and severed lower bag 10 drops from apparatus 50.

Referring again to FIGS. 7 and 7A, unlike conventional such blades with punched-out slots placed intermittently along the cutting or working edge of the blade or unslotted blades with a scalloped cutting edge arranged to pass only partially through the packaging material, blade 92a has a unique cutting or working edge designed to force each cut produced by the blade to follow a precise pattern that forms the smile perforations 42 shown in FIG. 5. More particularly, the edge of blade 92a has a series of identical scalloped blade segments 122 separated by slots 124 which leave the tabs 40 in bag 10. As shown in FIG. 7 (at one blade end), such segments do not extend to the opposite ends of blade 92a so that the blade leaves the unperforated areas 44 (FIG. 5) at the opposite lower corners of the bag 10.

As best seen in FIGS. 7A and 7B, the upper surface 122a of each blade segment is dished from side to side so that surface 122a has more or less cylindrical curvature. The working or cutting edge 126 of each segment 122 is scalloped in that the opposite sides or shoulders 126a of each segment are rounded where they join the opposite bevelled side edges 125 of the segment. From those shoulders, the working edge projects forwardly as two gentle S-curved portions 126b which join at a pronounced point 126c at the center of the segment. Furthermore, the upper surfaces of those edge portions on opposite sides of point 126c have pronounced downward bevels 128. Thus, the actual cutting by each blade segment occurs beginning at point 126c at the bottom surface of the segment, then progresses along the lower edges of edge portions 126b to the shoulders 126a. At those locations, the cutting edge 126 makes a smooth transition to the upper surface of the segment to the upwardly beveled edges 125 at the opposite sides of the segment. The edges 126 of the knife segments, beveled thusly, create the gently upwardly curved tapered segments 42a of the smile perforations 42. In this connection, it should be noted that the dimensions of the blade segments 122 determine the perforation dimensions given above and the shape of those segments ensures that there are no sharp direction changes in the cutting of material 12 as might produce nicks in the cut edges of the material which could, in turn, be sites for uncontrolled tearing of that material.

Each blade segment 122 begins its cut right at the blade edge point 126c in the center of each segment at the bottom of the segment, the point furthest away from slots 124 which leave the tabs 40 in the bag material. Therefore the cutting action of the blade applies minimum stress to those tabs. The cut made by each blade segment then follows the cutting edge S-curved portions 126b and shoulders 126a in opposite directions from point 126c. Due to the shape of the beveled cutting edge 126, the only direction changes cut in the material are the gently rounded, upwardly curved segments 42a at opposite sides of the perforation. Finally, there is then a smooth transition at shoulders 126a of the blade edge to the upper cutting edges 125 at the sides of the blade segment bordering the adjacent slots 124 that form the tapered ends of perforation 42. By making the cut through the packaging material 12 before the tabs 40 are formed between adjacent perforations 42, the cut edges in the material tend to be more even and nick free along the curved portions 42a of the perforations. Obviously, the blade slots 124 should be no wider than is required to leave the minimum amount of uncut bag material 12 between the perforations 42 needed to maintain the integrity of the tabs until they are deliberately broken by pulling the reclosure tie 32 from the bag.

Still referring to FIGS. 7A and 7B, the dished upper surface 122a of each blade segment increases the severity of the angles at the opposite ends of each perforation 42, i.e. the rounded or curved portions 42a thereof. The dishing of the blade segment also reduces the thickness and overall mass of the perforating blade 92a as it passes into its bed 92b, thereby reducing stress on tabs 40 and wear on the bed. Blade 92a does not have to be separately heated in order to create well-formed perforations 42 having clean, nick-free edges because the blade receives enough heat by conduction from the heated jaw section 76a and the heated mold bar 96a. A separately heated blade 92a does, however, create an even smoother, cleaner cut at the edges of perforations 42 because the hot blade tends to weaken the plastic material 12 being cut and to sear any frayed edges thereof as it passes through the material.

Because the perforations 42 are very precise cuts, unlike normal tear line cuts, slits or holes usually formed in sheet material of this type, it is desirable to carefully control or position the packaging material 12 relative to blade 92a when the perforations are being made. The blade bed 92b helps in this respect in that it supports the flattened bag tube 58 when the tube is stretched across the bed by the closed jaw sections 76a and 76b on the one hand and the mold bar 92a and its bed 92b on the other, as discussed above. Bed 92b is shaped and arranged to fill the space on the side of material 12 opposite blade 92a and is made of a resilient material that can be penetrated by the blade after it passes through the packaging material in such a way that the bed controls the tension exerted by the blade on that material. It does this by giving support particularly to those areas of the material which are to be left uncut, i.e. tabs 46, and acts as a squeegee so that the material cannot be carried by the blade into the blade-receiving cut or slot 95b in the bed. If that were to occur, the bag material 12 might be overly stretched to the extent that connecting tabs 40, which are narrow by design, might break or tear prematurely. The backing up of material 12 by the bed also produces a smoother cut in the bag material by forcing the blade to slice through the material rather than simply punching through it.

Of course, some stronger bag materials 12 do not require as much support when being perforated by blade 92a so that other means could be utilized to support the areas of such stronger materials which are left uncut. For example, in some cases, a brush may be used in lieu of the blade bed 92b. Indeed, if the material 12 is sufficiently strong, the integrity of the tabs will be preserved even if there is no back-up or bed at all opposite blade 92a, particularly if that blade is separately heated.

Figure 9:
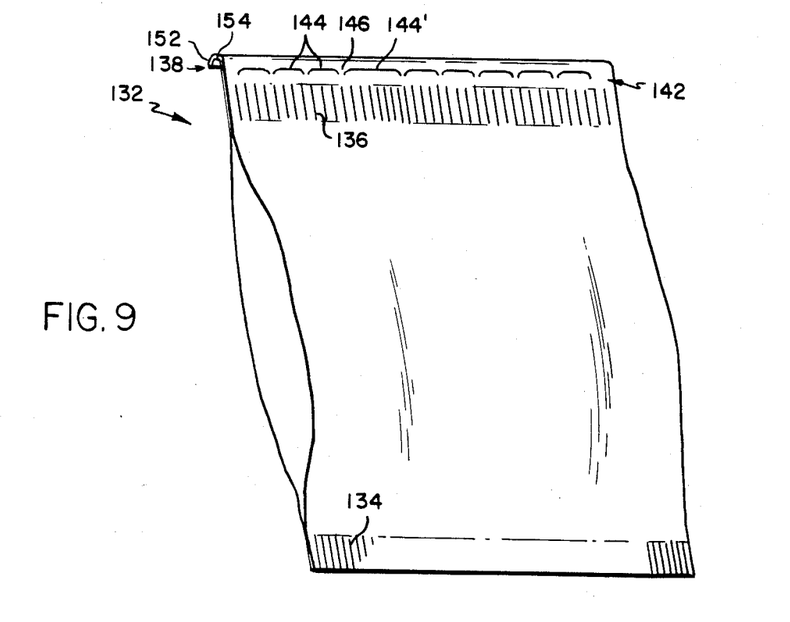
FIG. 9 is a view similar to FIG. 1 of another bag embodiment made in accordance with this invention.

Bags made in accordance with this invention not only allow for the placement of the reclosure tie 32 at the bottom of the bag described above, but also adjacent a seal intended to be opened at the top, or side of the bag. FIG. 9 illustrates a top-opening bag generally at 132 which could be used, for example, to package cereal. The bottom of this bag 132 is closed by a conventional seal 134 which extends across the entire width of the bag with no provision being made for breaking or opening that seal. The top of the bag is closed by a top seal 136 which also extends the full width of the bag. A reclosure tie shown generally at 138 extends across the top of the bag above seal 136, being separable therefrom along a parting line 142 composed of a series of closely spaced smile perforations 144 separated by narrow tabs 146.

Since the tie 138 is designed to be pulled away from bag 132 in an upward direction, the smile perforations 146 are inverted relative to the positions of the corresponding perforations 42 in the bag 10. Otherwise, tie 138 is identical to tie 32 in that it is composed of a short tubular extension 152 of the bag material whose opposite walls are sealed along a mold channel 154. The free edge of extension 152 constitutes the upper edge of the bag 132 which was severed from a succeeding bag in the series of bags being filled as described above.

Bag 132 is formed by sealing jaws identical to jaws 72 and 74 depicted in FIG. 7. The locating of the reclosure tie 138 at the top of the bag results from loading the roll of material 12 into the FIG. 6 apparatus 50 so that the material is moved through the apparatus with its graphics reversed or upside down. That is, what was the bottom of bag 10 is now the top of bag 132. Alternatively, the jaws can be inverted to achieve the same effect.

Figure 10A:
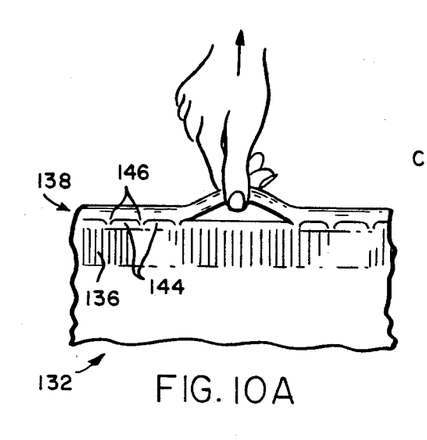
FIGS. 10A and 10B are fragmentary perspective views of the FIG. 9 bag which illustrate the easy-open and reclosing features of that bag.

In order to open bag 132, the reclosure tie 138 must first be removed from the top of the bag. To do this, the user pulls the middle of the tie upwardly as shown in FIG. 10A. This separates the tie from the body of the bag along the parting line 142 as described above so that no uncontrolled tears are initiated in the body of the bag. Due to the upside down smile perforations 144, the tabs 146 connecting the reclosure tie to the remainder of the bag part along downwardly curved tear lines thereby producing rounded nicks 155 at the now exposed upper edge of the bag and rounded nubs 156 on the edge of the reclosure tie 138 as best seen in FIG. 10B.

If the extra long perforation 144' is positioned slightly to the left of the bag vertical center line as shown in FIG. 9, the left-hand end of the reclosure tie 138 will separate from the remainder of bag 132 before the right-hand end thereof does. Therefore, if desired, the right-hand end of the reclosure tie can be left connected to the bag as shown in FIG. 10B so that the tie will be available when needed.

Figure 10B:
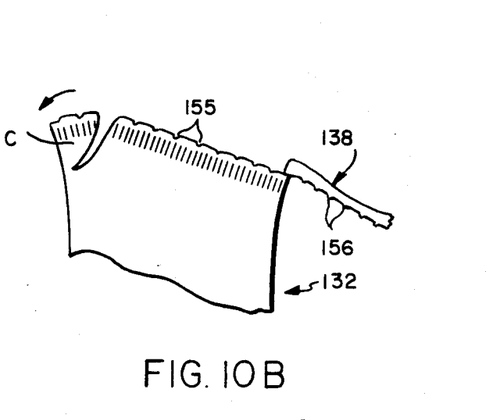

The removal of the reclosure tie as shown in FIG. 10B exposes the seal 136 at the top of the bag. An easy open area need not be provided in the seal because, as described above, when the tie 138 is removed, nicks 155 are left in the upper edge of the bag where the tabs 146 were torn away. These nicks constitute tear sites so that any one of them, can be used to provide easy-open access to the interior of the bag. In other words, by grasping the top of the bag and tearing at a nick 155, say, one near the left-hand corner of the bag, that corner can be torn off as shown at C in FIG. 10B thereby permitting the user to insert his thumbs into the resulting hole in the bag and spread apart the opposite walls of the bag thereby breaking its seal 136.

If it is desired to reclose the bag after its contents are partially consumed, the upper portion of the bag is gathered together and the reclosure tie 138 is separated completely from the top of the bag and tied around that portion to secure it in the same manner described above in connection with bag 10.

Of course, if the contents of bag 132 is unaffected by contact with air, top seal 136 may be omitted since the reclosure tie 138 effectively secures the top of the bag.

A reclosure tie at the top of the bag thus has all of the advantages of a tie located at the bottom of the bag. In addition, however, the top reclosure tie provides a lock which prevents the user from opening the bag until the reclosure tie is substantially removed from the bag. Moreover, the removal of the tie can create nicks which provide sites to tear easily through the bag seal 136 to gain access to the interior of the bag.

It will be appreciated that various modifications can be made to the above-described bags and to the apparatus for making them depending upon the particular packaging application. For example, and referring to FIGS. 7 and 11, if the mold bar tongue 102a used to make bag 10 is shortened as shown in dotted lines at 102c in FIG. 7 so that it does not extend the full width of the bag, it produces a reclosure tie 32' having a shortened mold channel 36' which terminates at a location spaced from the end of the tie. Resultantly, where the tongue is not present, the walls of tie tube 34' are unsealed and form a loop 37' through which the opposite end of the tie can be inserted enabling the tie to be drawn tight around the neck of the bag as shown in FIG. 11. It should be pointed out in this connection that the nubs present on the edge of the reclosure tie as described above help to retain the tie within loop 37' by engaging the edge of the loop so that the tie has little tendency to pull back through the loop.

Figure 12:
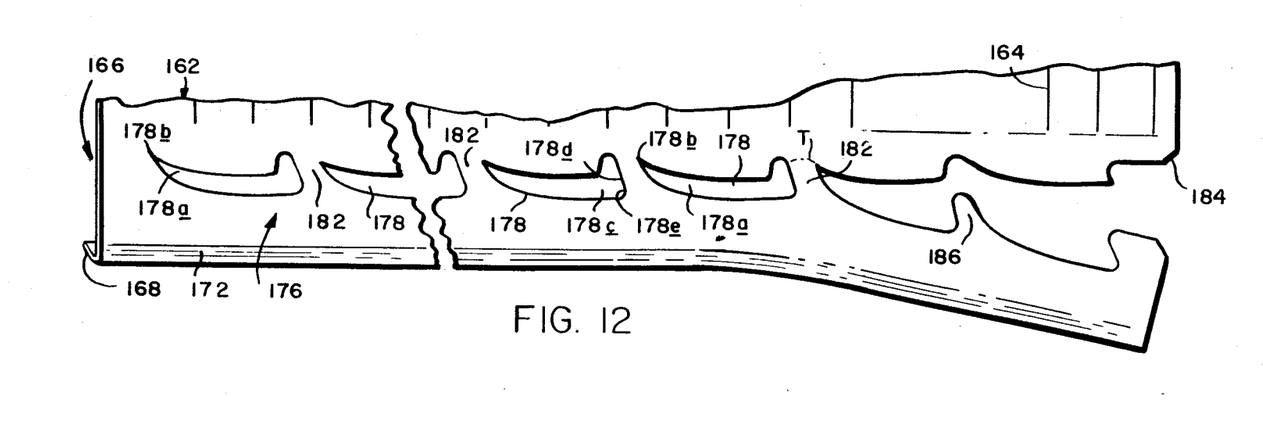
FIG. 12 is a view similar to FIG. 5 illustrating still another embodiment of our new bag or package.

The smile perforations described above are designed specifically to produce a controlled tear in packaging material 12 to separate a reclosure tie from the top or bottom of a package or bag in response to an upward or downward pulling force applied intermediate the ends of the reclosure tie. Since the tears propagate in both directions toward the ends of the tie, the smile perforations 42 are symmetric about their vertical center lines. In some applications, however, it may be desirable to provide a bag whose reclosure tie can be separated from the bag with the tear beginning at one end of the reclosure tie, i.e., at one side edge of the bag. FIG. 12 illustrates such a bag generally at 162. This bag has the usual bottom seal 164 and a reclosure tie shown generally at 166 removably connected to the bottom of the bag. The tie comprises a short tubular extension 168 of bag material whose opposite walls are bonded together to form a transverse mold channel 172. The tie is separable from the body of the bag along a parting line indicated generally at 176 composed of a series of specially shaped perforations 178 separated by tabs 182 and extending across the bag between seal 164 and mold channel 172, with the opposite ends of the tear line terminating well inboard of the side edges of the bag.

The perforations 178 in bag 162 are designed to enable the reclosure tie 166 to be separated along line 176 from the body of the bag by pulling down the right-hand end of the reclosure tie. In this case, the separation or tear will always progress from right to left along the parting line 176 as depicted in FIG. 12. Accordingly, the left halves of the perforations 178 may be identical to the left halves of perforations 42 in bag 10. That is, the left half of each perforation 178 has an upward curve 178a which tapers to a point 178b. Since the edges of the perforation are even and nick-free, the most likely tear site in each tab 182 in response to a downward-leftward tear force is at end point 178b.

The right half of each perforation 178 has an entirely different shape designed to maximize the chances of its intercepting a tear initiated at end 178b of the perforation spaced to the right of it. As seen in FIG. 12, the right half of each perforation has an outward flair 178c, with the right-hand edge segment 178d of the perforation being more or less parallel to and coextensive with the left-hand curved end portion 178a of the adjacent perforation 178. A gently rounded edge segment 178e joins the bottom and right-hand edge segments of perforation 178 creating a smooth, even transition at that location. Because of their vertically unsymmetric shapes, perforations of this type are denominated smirk perforations to distinguish them from the symmetric smile perforations discussed previously.

When a downward force is applied to the right-hand end of the reclosure tie 166, a tear is developed which propagates into the first perforation 178. A small nick 184 may be provided in the right-hand edge of bag 162 colinear with the perforation line 176 to facilitate the start of a tear at that location. Since there are no nicks or weak spots in the perforation edges except at the perforation end point 178c, a tear is initiated at that location. Due to the downward-leftward force exerted on the tie by the user, the tear follows an upwardly curved arc through tab 182 as indicated by the dotted line T in FIG. 12. Due to the illustrated shape of the right half of the smirk perforation, the tear along line T is assuredly intercepted by the right half of the next perforation 178 at its edge 178d and follows the rounded lower edge segment 178e and the nick-free lower edge of that perforation to the next tab 182, and so on.

Thus, as the reclosure tie 166 is pulled away from the body of the bag, the bag material is torn only across the tabs 182; there are no uncontrolled tears which propagate into the bag bottom seal 164 or into the reclosure tie 166. Consequently, bag 162 has all of the advantages discussed above in connection with bag 10. Also, as with bag 10, the removal of the reclosure tie from the bottom of the bag leaves only rounded nubs 186 on the parting edge of the reclosure tie which nubs do not promote tearing of the tie when that is tensioned to reclose the bag as described above.

Of course, if it is desired that the reclosure tie be separated by a downward force applied to the left-hand end of the reclosure tie, the smirk perforations 178 illustrated in FIG. 12 would be reversed, i.e. so that their ends 178b point to the right.

Obviously, sealing jaws similar to jaws 72 and 74 can be used to form the parting line 176 in the bag material. Only the shapes of the right halves of the perforation blade segments 122 (FIG. 7) would have to be changed to conform to the desired shapes of the right halves of the smirk perforations 178.

We have specifically illustrated apparatus for making the smile and smirk perforations by means of specially shaped blades and beds therefor. It should be appreciated, however, that those same parting lines may be created by other means. For example, the perforations could be cut from the packaging material 12 by mounting a 0.020 inch thick sheet metal "rule" die with one continuous cutting edge composed of smile-shaped beveled edge segments in the sealing jaw 72 in lieu of the perforating blade 92a. These could cut through the packaging material 12 into mating female receiving bed or anvil carried in jaw 74 at the location of bed 92b. The perforations could even be cut in the bag by sweeping a laser across the bag, with the laser light impinging on the bag through a mask containing a line of spaced-apart smile or smirk perforations.

In summary, we have disclosed a number of embodiments of a bag for packaging various articles, including food. The bag is easily opened and may be reclosed readily. In all the embodiments, the reclosure tie is formed integrally with the bag and is made of the same material as the bag. Moreover, it is made in the same operation by the same sealing jaws that form the seals of the bag. Also, our bag embodiments are constructed without requiring appreciably more bag material than is currently utilized in the construction of conventional bags which do not possess the above advantages. Furthermore, all of the bags disclosed herein are readily adapted for making by conventional forming and filling apparatus, the only required modification to that apparatus being the use of a set of replacement sealing jaws designed to produce the bag structures described above. From an examination of the bags and sealing jaws that have been specifically disclosed above, it will be apparent that there are wide ranges of modifications and alterations that can be made to these disclosed embodiments.

It will thus be seen that the objects set forth above, among those made apparent from the preceding description, are efficiently attained, and, since certain changes may be made in the above constructions without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described.

What is claimed as new and desired to be secured by Letters Patent of the United States is:

1. In a plastic bag of the type having opposite walls and at least one seal sealing the walls together in at least one location to form a pouch, the improvement comprising
   A. a separable reclosure tie positioned adjacent to said one seal, said tie comprising
      (1) relatively short integral extensions of said bag walls extending beyond said one seal,
      (2) integral reinforcing means in said wall extensions which extend generally transversely along said wall extensions; and
   B. a parting line extending between said one seal and said reinforcing means for separating said tie from said pouch-defining bag walls when the tie is pulled directly away from the seal at a selected location on the tie, said line being composed of a series of closely spaced collinear, substantially identical, elongaged perforations through said wall extensions, each said perforation having
      (1) a transverse centerline,
      (2) an end portion distal to said selected tie location whose opposite edges define an acute angle between them, and
      (3) an end portion proximal to said selected tie location which intercepts said parting line at an angle so that any tear caused by said pulling is initiated at the distal end portion of a perforation and propagates to the proximal end of the next adjacent perforation along a path of least resistance which arches away from said refinforcing means whereby no nicks or cuts are created in the torn edge of the reclosure tie by the separation of the tie.

2. The bag defined in claim 1 wherein the distal end portion of each perforation curves toward said one seal and tapers to a point.

3. The bag defined in claim 2 wherein the proximal end of each perforation curves toward said one seal and tapers to a point.

4. The bag defined in claim 3 wherein each said perforation is symmetric about its transverse center line.

5. The bag defined in claim 1 wherein the edge of each perforation is essentially smooth and nick free except at its end distal to said selected location.

6. The bag defined in claim 5 wherein said distal end portion of each perforation curves toward said one seal and tapers to a point.

7. The bag defined in claim 1 wherein said reinforcing means comprise an integral molding of said wall extensions.

8. The bag defined in claim 7 wherein said molding extends continuously along substantially the entire length of said tie.

9. The bag defined in claim 7 wherein said molding does not extend continuously along the entire length of said tie so that, where said molding is not present, said bag wall extensions can be separated to form a loop.

10. The bag defined in claim 1 wherein the perforations at the opposite ends of said parting line are spaced inboard of the edges of said bag wall extensions at the opposite ends of the tie.

11. A bag comprising
   A. a tube of flexible sheet material having opposite walls;
   B. a first seal sealing together the opposite walls of the tube adjacent one end of the tube;
   C. a second seal sealing together the opposite walls of the tube adjacent the opposite end of the tube;
   D. an integral mold channel in said opposite walls of the tube which extends across the tube between said second seal and said opposite end of the tube; and
   E. a series of closely spaced apart slits through said tube walls, said slits extending along a line between said second seal and said mold channel.

12. The bag defined in claim 11 wherein said mold channel is continuous and substantially coextensive with said second seal.

13. The bag defined in claim 11 wherein said tube ends have substantially smooth nick-free cut edges.

14. The bag defined in claim 11 wherein one of said seals has an unsealed area extending from within said one seal to the edge thereof distal to the other of said seals.

15. The bag defined in claim 14 wherein said unsealed area extends from within said second seal to the edge thereof adjacent said series of slits.

16. The bag defined in claim 11 wherein the opposite ends of each slit in the series of slits curve toward said second seal and taper to points.

17. The bag defined in claim 11 wherein the two slits at the opposite ends of the series of slits are spaced inboard of the opposite ends of the second seal.

18. The bag defined in claim 11 wherein each slit is smile-shaped.

19. The bag defined in claim 11 wherein each slit has two ends only one of which curves gently away from said mold channel.

20. The bag defined in claim 11 wherein each slit has smooth, nick-free edges between the ends of the slit.

21. In a bag of the type having opposite walls and at least one seal sealing the walls together in at least one location to form a pouch, the improvement comprising
   A. a reclosure tie positioned adjacent to said one seal, said tie comprising
      (1) relatively short integral extensions of said bag walls extending beyond said one seal,
      (2) integral reinforcing means in said wall extensions which extend generally transversely along said wall extensions, said reinforcing means comprising an integral molding of said wall extensions which forms a channel in said wall extensions; and
   B. a parting line extending between said one seal and said reinforcing means for separating said tie from said pouch-defining bag walls when the tie is pulled directly away from the seal at a selected location on the tie, said line including a series of closely spaced apart, elongated perforations through said wall extensions, each said perforation having
      (1) an end portion distal to said selected tie location having opposite edges which define an acute angle between them, and
      (2) an end portion proximal to said selected tie location whose edge closest to the distal end portion of the next adjacent perforation intercepts said parting line at an angle.

22. In a bag of the type having opposite walls and at least one seal sealing the walls together in at least one location to form a pouch, the improvement comprising
   A. a reclosure tie positioned adjacent to said one seal, said tie comprising
      (1) relatively short integral extension of said bag walls extending beyond said one seal, (2) integral reinforcing means in said wall extensions which extend generally transversely along said wall extensions;

B. a parting line extending between said one seal and said reinforcing means for separating said tie from said pouch-defining bag walls when the tie is pulled directly away from the seal at a selected location on the tie, said line including a series of closely spaced apart, elongated perforations through said wall extensions, each said perforation having (1) an end portion distal to said selected tie location having opposite edges which define an acute angle between them, and (2) an end portion proximal to said selected tie location whose edge closest to the distal end portion of the next adjacent perforation intercepts said parting line at an angle; and C. an unsealed area in said one seal which extends from within said one seal to the edge thereof adjacent said parting line.

23. In a bag of the type having opposite walls and at least one seal sealing the walls together in at least one location to form a pouch, the improvement comprising A. a reclosure tie positioned adjacent to said one seal, said tie comprising (1) relatively short integral extensions of said bag walls extending beyond said one seal, (2) integral reinforcing means in said wall extensions which extend generally transversely along said wall extensions;

B. a parting line extending between said one seal and said reinforcing means for separating said tie from said pouch-defining bag walls when the tie is pulled directly away from the seal at a selected location on the tie, said line including a series of closely spaced apart, elongated perforations through said wall extensions, each said perforation having (1) an end portion distal to said selected tie location having opposite edges which define an acute angle between them, and (2) an end portion proximal to said selected tie location whose edge closest to the distal end portion of the next adjacent perforation intercepts said parting line at an angle;

C. a second seal (1) sealing said bag walls together adjacent an edge of said bag, and (2) being spaced from said one seal; and D. an unsealed area in said second seal which extends from within said second seal to said bag edge.

24. The bag defined in claim 11 wherein the mold channel does not extend the entire length of said second seal.

25. The bag defined in claim 11 wherein at least one end portion of each slit in the series of slits curves toward said second seal.

26. The bag defined in claim 25 wherein said at least one end portion of each slit tapers to a point.

27. A plastic bag of the type having opposite walls and at least one seal sealing the walls together in at least one location to form a pouch and a separable reclosure tie positioned adjacent to said one seal and having an integral reinforcement which extends along the tie and a parting line located between said one seal and the reinforcement for separating the tie from the pouch-defining bag walls when the tie is pulled directly away from the seal at a selected location on the tie, the improvement wherein the parting line is composed of a single line of closely spaced, collinear, substantially identical, elongated perforations through the bag walls each said perforation having A. an end portion distal to the selected tie location which curves away from the reinforcement and whose opposite edges define an acute angle between them; and B. an end portion proximal to said selected location whose edge closest to the distal end portion of the next adjacent perforation intercepts said parting line at an angle so that any tear caused by said pulling is initiated at the distal end portion of a perforation and propagates to the proximal end of the next adjacent perforation along a path of least resistance which arches away from said reinforcement whereby no nicks or cuts are created in the torn edge of the reclosure tie by the separation of the tie.

* * * * *